(12) United States Patent
Moskovitch et al.

(10) Patent No.: US 8,776,231 B2
(45) Date of Patent: Jul. 8, 2014

(54) UNKNOWN MALCODE DETECTION USING CLASSIFIERS WITH OPTIMAL TRAINING SETS

(76) Inventors: Robert Moskovitch, Ashkelon (IL); Yuval Elovici, Moshav Arugot (IL)

( * ) Notice: Subject to any disclaimer, the term of this patent is extended or adjusted under 35 U.S.C. 154(b) by 1027 days.

(21) Appl. No.: 12/471,529

(22) Filed: May 26, 2009

(65) Prior Publication Data

US 2009/0300765 A1  Dec. 3, 2009

(30) Foreign Application Priority Data

May 27, 2008 (IL) .......................................... 191744

(51) Int. Cl.
*G06F 21/00* (2013.01)

(52) U.S. Cl.
USPC .................................. 726/24; 726/22; 726/26

(58) Field of Classification Search
USPC .......................................................... 726/24
See application file for complete search history.

(56) References Cited

U.S. PATENT DOCUMENTS

| | | | |
|---|---|---|---|
| 6,622,134 B1 | 9/2003 | Sorkin | |
| 7,415,445 B2 * | 8/2008 | Forman | 706/20 |
| 2004/0148266 A1 * | 7/2004 | Forman | 706/46 |
| 2006/0037080 A1 * | 2/2006 | Maloof | 726/24 |

OTHER PUBLICATIONS

"N-gram-based Detection of New Malicious Code", Abou-Assaleh et al, Proceedings of the 28th Annual International Computer Software and Applications Conference, IEEE CSP, 2003.

Kolter, J.Z et al: "Learning to detect . . . wild"; Aug. 2004; XP7909929.
Moskovitch, R. et al: "Improving the detection . . . Learning"; Sep. 10, 2007; XP019099086.
Kolter, J.Z., Maloof, M.A.: "Learning to detect and classify . . . wild"; Dec. 2006; XP7909930.
Moskovitch; Gus; Pluderman; Stopel; Feher; Glezer; Shahar; Elovici: Detection of unknown . . . Mining Apr. 2007; XP031095439.
Olivier Henchiri et al: "A Featured Selection . . . Detection" Dec. 2006; XP031003105.
httpwww.newsfactor.comstory.xhtmlstory_id=010000CEUEQO, dated Jun. 4, 2007.
Malware Prevalence in the KaZaA File-Sharing Network, Internet Measurement Conference (IMC), Brazil, Oct. 2006.
Special Issue on Learning from Imbalanced DataSets, NV Chawla et al, 2004.
A Feature Selection and Evaluation Scheme for Computer Virus Detection, O. Henchiri et al, Proceedings of the Sixth ICDM, 2006.

(Continued)

*Primary Examiner* — Fikremariam A Yalew
*Assistant Examiner* — Kendall Dolly
(74) *Attorney, Agent, or Firm* — Roach Brown McCarthy & Gruber, P.C.; Kevin D. McCarthy

(57) ABSTRACT

A method for detecting unknown malicious code is provided. A data set is created, which is a collection of files that includes a first subset with malicious code and a second subset with benign code files, whereas the malicious and benign files are identified by an antivirus program. Subsequently, all files are parsed and a set of top features of all-n grams of the files is selected and reduced by using features selection methods. After determining the optimal number of features, they will be used as training and test sets.

2 Claims, 14 Drawing Sheets

(56) References Cited

OTHER PUBLICATIONS

Learning to Detect and Classify Malicious Executables in the Wild, JZ Kolter, Journal of Machine Learning Research 7 pp. 2721-2744, 2006.
Learning to Detect and Classify Malicious Executables in the Wild, JZ Kolter et al, ACM 2004.
Acquisition of Malicious Code Using Active Learning, R. Moskovitch et al, Intelligence and Security Informatics, May 2007.
Data Mining Methods for Detection of New Malicious Executables, MG Schultz et al, IEEE 2001.
A vector space model for automatic indexing, G. Salton, ACM 1975.

* cited by examiner

UNKNOWN MALCODE DETECTION USING CLASSIFIERS WITH OPTIMAL TRAINING SETS

FIELD OF THE INVENTION

The present invention relates to the field of Information Systems Security. More particularly, it relates to a method for allowing detection of unknown MalCode (Malicious Code) by setting optimized training set for the classifiers.

BACKGROUND OF THE INVENTION

Defintions:
Adaboost (Boosting): A method for combining multiple classifiers. Adaboost was introduced by [Freund and Schapire, 1997]. Given a set of examples and a base classifier, it generates a set of hypotheses combined by weighted majority voting. Learning is achieved in iterations. A new set of instances is selected in each iteration by favoring misclassified instances of previous iterations. This is done using an iteratively updated distribution that includes a probability for each instance to be selected in the next iteration.
Artificial Neural Networks (ANN) [Bishop, 1995]: An information processing paradigm inspired by the way biological nervous systems, such as the brain, process information. The key element is the structure of the information processing system, which is a network, composed of a large number of highly interconnected neurons working together in order to approximate a specific function. An ANN is configured for a specific application, such as pattern recognition or data classification, through a learning process during which the individual weights of different neuron inputs are updated by a training algorithm, such as back-propagation. The weights are updated according to the examples the network receives, which reduces the error function. The next equation presents the output computation of a two-layered ANN, where x is the input vector, $v_i$ is a weight in the output neuron, g is the activation function, $w_{ij}$ is the weight of a hidden neuron and $b_{i,o}$ is a bias.

$$f(x) = g\left[\sum_i v_i g\left(\sum_j w_{ij} x_i + b_i\right) + b_0\right]$$

Antivirus and Antispywares: Software that enables to search for viruses and/or spywares and removes them. It can be up-dated to be able to check for new viruses and/or spywares. In the most cases, this type of software is signature based.
Backdoor (or trapdoor): A way for allowing access to IT system (program, online service or an entire system). These codes are written by the programmer who creates a program code or can be injected in the code by a malcode programmer.
Behaviour blocker: System which attempts to detect sequences of events in operating systems.
Binary code: Codes consisting of logical zeros and ones.
Binary file: Computer file which may contain any type of data, encoded in binary form for computer storage and processing purposes.
Boosting: ML meta-algorithm for performing supervised learning.
Categorization: Process, in which entities are identified, differentiated and classified. Categorization implies that objects are grouped into categories, usually for some specific purpose.
Class: a collection of objects that can be unambiguously defined by one or more properties that all its members share.
Classifier: A rule set which is learnt from a given training-set, including examples of classes. Related to the present invention these classes are both malicious and benign files.
Data Mining (DM): It has been described as "the nontrivial extraction of implicit, previously unknown, and potentially useful information from data" [Frawley, Piatetsky-Shapiro, Matheus 1992] and "the science of extracting useful information from large data sets or databases" [Hand, Mannila, Smyth 2001].
Decision Trees (DT): Well established family of learning algorithms [Quinlan, 1993]. Classifiers are represented as trees whose internal nodes are tests of individual features and whose leaves are classification decisions (classes). Typically, a greedy heuristic search method is used to find a small decision tree, which is induced from the data set by splitting the variables based on the expected information gain. This method correctly classifies the training data. Modern implementations include pruning, which avoids the problem of overfitting. One of the well known algorithms from this family is the C4.5 algorithm [Quinlan, 1993] and another implementation of it called J48 [Witten and Frank, 2005]. An important characteristic of decision trees is the explicit form of their knowledge, which can be easily represented as rules.
Feature Extraction (FE): A special form of dimensionality reduction based on the transformation of an input dataset into a set of features.
File: A collection of data or information called by a filename. It can contain textual, numerical, graphical, audio and video data. Many of them can by executable files (or can contain executable code).
  Benign file: File which did not contain malcode
  Malcode file: File which contain at least a part of malcode
Heuristic-Based methods: Methods which are based on rules defined by experts, which define a behavior in order to enable the detection them. [Gryaznov, 1999]
Imbalance problem: In ML, problem which can appear in the learning process when a class is represented by a large number of examples while the other is represented by only a few.
Information Retrieval (IR): Science of information searching. This informatiom can be a full document or a part of. A document in this field it is any element which contian data. A computer file is here a document.
Integrity checkers: System which periodically check for changes in files and disks.
Network Services (and Internet Network Services): "Softwares" which provide to a client computer services (such as webmail) or shared ressources (such as data sharing).
KNN (K-Nearest-Neighbor): An ML algorithm. It classifies an object according to a majority vote of its neighbors. An object is assigned to the class most common amongst its k nearest neighbors.

Machine learning (ML): Subfield of Artificial Intelligence and it rellated to the design and the development of algorithms and techniques allowing computers to "learn".

Malcode (Malicious Code): commonly refers to pieces of code, not necessarily executable files, which are intended to harm, generally or in particular, the specific owner of the host. Malcodes are classified, mainly based on their transport mechanism, into five main categories: worms, viruses, Trojans and new group that is becoming more common, which is comprised of remote access Trojans and backdoors.

Naïve Bayes (NB) classifier: It is based on the Bayes theorem, which in the context of classification states that the posterior probability of a class is proportional to its prior probability, as well as to the conditional likelihood of the features, given this class. If no independent assumptions are made, a Bayesian algorithm must estimate conditional probabilities for an exponential number of feature combinations. NB simplifies this process by assuming that features are conditionally independent, given the class, and requires that only a linear number of parameters be estimated. The prior probability of each class and the probability of each feature, given each class is easily estimated from the training data and used to determine the posterior probability of each class, given a set of features. Empirically, NB has been shown to accurately classify data across a variety of problem domains [Domingos and Pazzani, 1997].

n-gram: Sub-sequence of n items from a given sequence.

Network: Defines a system which provides access paths for communication between users. Communication networks may be designed for data, voice and video. They may be private with a limited access or public with an open access.

Signature-Based methods: Methods, which rely on the identification of unique strings in the code; while being very precise, it is useless against unknown malicious code.

Spyware: Any software application that, without the user's knowledge, collects information about the system it resides on and reports that information back to a third party. Like a virus it can be loaded onto a computer without user.

Support Vector Machines (SVM): A binary classifier, which finds a linear hyperplane that separates the given examples of two classes known to handle large amounts of features. Given a training set of labeled examples in a vector format, the SVM attempts to specify a linear hyperplane that has the maximal margin, defined by the maximal (perpendicular) distance between the examples of the two classes. The examples lying closest to the hyperplane are known as the supporting vectors. The normal vector of the hyperplane (denoted as w in the next equation, in which n is the number of the training example) is a linear combination of the supporting vectors multiplied by LaGrange multipliers (alphas). Often the data set cannot be linearly separated, so a kernel function K is used. The SVM actually projects the examples into a higher dimensional space to create a linear separation of the examples.

$$f(x) = \text{sign}(w \cdot \Phi(x)) = \text{sign}\left(\sum_{i}^{n} \alpha_i y_i K(x_i x)\right)$$

Test Set: Data set used to test the quality of a classification algorithm.

Training Set: Data set used to allow to a classification algorithm to identify classes.

Text Categorization: Classification of documents into a predefined number of categories. Each document can be in zero, one or more category. Using ML, the objective is to learn classifiers which perform the category assignments automatically.

Trojan (or Trojan Horse): A destructive program which is presented as a benign file. They do not replicate themselves like the viruses.

Virus: A program or piece of code that is loaded onto a computer without user knowledge and runs against user wishes. It can replicate it selves. A virus is not always destructive but can disturb the computer work using up the computer's resources.

Worm: A program that replicates itself over a computer network and usually performs malicious actions, such as using up the computer's resources.

The recent growth in high-speed internet connections and in internet network services has led to an increase in the creation of new malicious codes for various purposes, based on economic, political, criminal or terrorist motives (among others). Some of these codes have been used to gather information, such as passwords and credit card numbers, as well as behavior monitoring. Current antivirus and antispywares technologies are primarily based on two approaches: signature-based and heuristic. Other proposed methods include behavior blockers and integrity checkers. However, besides the fact that these methods can be bypassed by viruses or spywares, their main drawback is that, by definition, they can only detect the presence of a malcode after the infected program has been executed, unlike the signature-based methods, including the heuristic-based methods, which are very time-consuming and have a relatively high false alarm rate. Therefore, generalizing the detection methods to be able to detect unknown malcodes is crucial.

In the previous approaches, classification algorithms were employed to automate and extend the idea of heuristic-based methods. The binary code of a file is represented by n-grams and classifiers are applied to learn patterns in the code and classify large amounts of data. Studies have shown that this is a very successful strategy. However, these ones present evaluations based on test collections, having similar proportion of malicious versus benign files in the training set and test collections (50% of malicious files). This has two potential failures. These conditions do not reflect real life situation, in which malicious code is commonly significantly less than 50% and additionally these conditions might report optimistic results.

Recent survey made by McAfee (McAfee Study Finds 4 Percent of Search Results Malicious, By Frederick Lane, Jun. 4, 2007: [http://www.newsfactor.com/story.xhtml?story_id=010000CEUEQO] indicates that about 4% of search results from the major search engines on the web contain malicious code. Additionally, Shin (Shin, J. Jung, H. Balakrishnan, Malware Prevalence in the KaZaA File-Sharing Network, Internet Measurement Conference (IMC), Brazil, October 2006) found that above 15% of the files in a Peer-to-Peer network contained malicious code. According to these data, the proportion of malicious files in real life is about or less than 10%.

Over the last years, several studies have investigated the direction of detecting unknown malcode based on its binary code. Shultz et al. [Shultz et al. 2001] were the first to introduce the idea of applying ML and DM methods for the detection of different malcodes based on their respective binary codes. They used three different FE approaches: program header, string features and byte sequence features, in which they applied four classifiers: a signature-based method (an antivirus one), Ripper—a rule-based learner, NB and Multi-Naïve Bayes. This study found that all of the ML methods were more accurate than the signature-based algorithm. The ML methods were more than twice as accurate when the out-performing method was Naïve Bayes, using strings, or Multi-NB using byte sequences. Abou-Assaleh et al. [2004] introduced a framework that used the common n-gram (CNG) method and the KNN classifier for the detection of malcodes. For each class, malicious and benign, a representative profile has been constructed and assigned a new executable file. This executable file has been compared with the profiles and matched to the most similar. Two different data sets were used: the I-worm collection, which consisted of 292 Windows internet worms and the win32 collection, which consisted of 493 Windows viruses. The best results were achieved by using 3 to 6 n-grams and a profile of 500 to 5000 features.

Kolter and Maloof [Kolter and Maloof 2004] presented a collection that included 1971 benign and 1651 malicious executables files. n-grams were extracted and 500 were selected using the Information Gain measure [Mitchell, 1997]. The vector of n-gram features was binary, presenting the presence or absence of a feature in the file and ignoring the frequency of feature appearances. In their experiment, they trained several classifiers: IBK (a KNN classifier one), a similarity based classifier called TFIDF classifier, NB, SMO (a SVM classifier one) and J48 (a Decision Tree). The last three of these were also boosted. Two main experiments were conducted on two different data sets, a small collection and a large collection. The small collection included 476 malicious and 561 benign executables and the larger collection included 1651 malicious and 1971 benign executables. In both experiments, the four best performing classifiers were Boosted J48, SVM, Boosted SVM and IBK. Boosted J48 out-performed the others. The authors indicated that the results of their n-gram study were better than those presented by Shultz and Eskin [Shultz and Eskin 2001].

Recently, Kolter and Maloof [Kolter and Maloof 2006] reported an extension of their work, in which they classified malcodes into classes based on the functions in their respective payloads. In the categorization task of multiple classifications, the best results were achieved for the classes' mass mailer, backdoor and virus (no benign classes). In attempts to estimate the ability to detect malicious codes based on their issue dates, these techniques were trained on files issued before July 2003, and then tested on 291 files issued from that point in time through August 2004. The results were, as expected, lower than those of previous experiments. Those results indicate the importance of maintaining such a training set through the acquisition of new executables, in order to cope with unknown new executables.

Henchiri and Japkowicz [Henchiri and Japkowicz 2006] presented a hierarchical feature selection approach which enables the selection of n-gram features that appear at rates above a specified threshold in a specific virus family, as well as in more than a minimal amount of virus classes (families). They applied several classifiers: ID3 (a Decision Tree), J48, NB, SVM and SMO to the data set used by Shultz et al. [Shultz et al. 2001] and obtained results that were better than those obtained through traditional feature selection, as presented in [Shultz et al., 2001], which mainly focused on 5-grams. However, it is not clear whether these results are more reflective of the feature selection method or the number of features that were used.

The class imbalance problem was introduced to the ML research community about a decade ago. Typically it occurs when there are significantly more instances from one class relative to other classes. In such cases the classifier tends to misclassify the instances of the low represented classes. More and more researchers realized that the performance of their classifiers may be suboptimal due to the fact that the datasets are not balanced. This problem is even more important in fields where the natural datasets are highly imbalanced in the first place [Chawla et al, 2004], like the problem we describe.

Salton presented the vector space model [Salton and Weng, 1975] to represent a textual file as a bag of words. After parsing the text and extracting the words, a vocabulary, of the entire collection of words is constructed. Each of these words may appear zero to multiple times in a document. A vector of terms is created, such that each index in the vector represents the term frequency (TF) in the document. Equation 1 shows the definition of a normalized TF, in which the term frequency is divided by the maximal appearing term in the document with values in the range of [0;1].

Another common representation is the TF Inverse Document Frequency (TFIDF), which combines the frequency of a term in the document (TF) and its frequency in the documents collection, as shown in Equation 2, in which the term's (normalized) TF value is multiplied by the IDF=log(N/n), where N is the number of documents in the entire file collection and n is the number of documents in which the term appears.

$$TF = \frac{\text{term frequency}}{\max(\text{term frequency in document})} \quad [\text{Eq. 1}]$$

$$TFIDF = TF \times \log(DF), \quad [\text{Eq. 2}]$$
$$\text{where } DF = \frac{N}{n}$$

It is therefore an object to the present invention to provide a method for increasing the unknown malcode discovery and detection ratio.

It is another object to the present invention to provide a method based on IR concepts and text categorization.

It is a further object to the present invention to overcome the imbalance problem in the training step and to optimize classifiers test set to be in accordance with real-life scenarios.

It is still an object of the present invention to provide efficient malcode detection with commonly used classification algorithms.

It is yet an object to the present innovation to enable to provide efficient malcode detection with low levels of false alarms.

Further purposes and advantages of this invention will appear as the description proceeds.

SUMMARY OF THE INVENTION

The present invention is directed to a method for detecting unknown malicious code, such as a virus, a worm, a Trojan Horse or any combination thereof. Accordingly, a Data Set is created, which is a collection of files that includes a first subset with malicious code and a second subset with benign code files and malicious and benign files are identified by an antivirus program. All files are parsed using n-gram moving windows of several lengths and the TF representation is computed for each n-gram in each file. An initial set of top features (e.g., up to 5500) of all n-grams IS selected, based on the DF measure and the number of the top features is reduced to comply with the computation resources required for classifier training, by using features selection methods. The optimal number of features is then determined based on the evaluation of the detection accuracy of several sets of reduced top features and different data sets with different distributions of benign and malicious files are prepared, based on the optimal number, which will be used as training and test sets. For each classifier, the detection accuracy is iteratively evaluated for all combinations of training and test sets distributions, while in each iteration, training a classifier using a specific distribution and testing the trained classifier on all distributions. The optimal distribution that results with the highest detection accuracy is selected for that classifier.

The detection accuracy may be evaluated by using the accuracy measure, TPR measure or FPR measure.

All the above and other characteristics and advantages of the invention will be further understood through the following illustrative and non-limitative description of preferred embodiments thereof, with reference to the appended drawings; wherein like components are designated by the same reference numerals.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
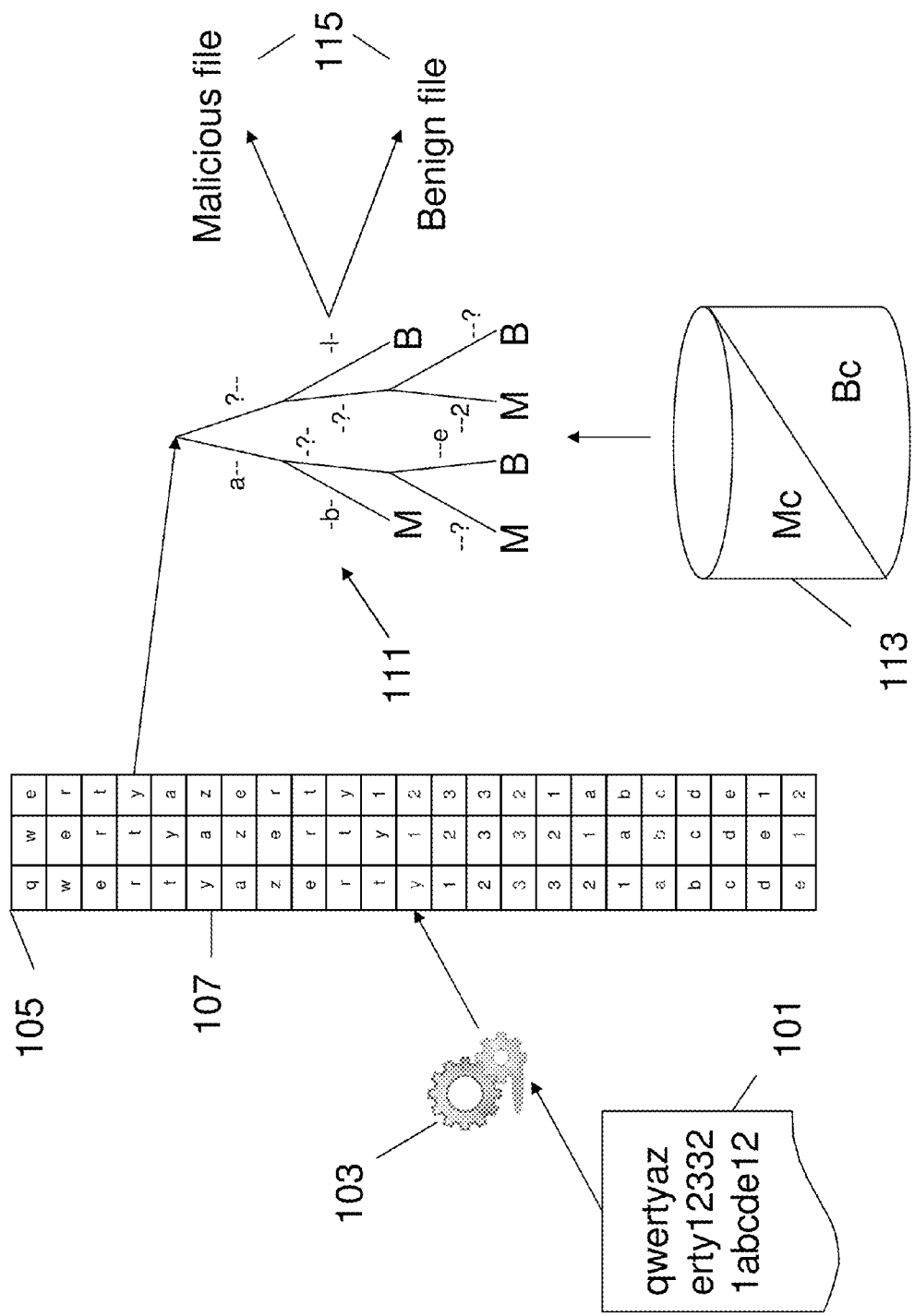
FIG. 1 schematically illustrates the process for malicious code detection for the present innovation.

FIG. 1 schematically describes the process for detecting the type of the code (benign or malicious) of a file. A file (101) which can be anywhere on a network e.g.: router, computer . . . and which while being check and parsed (103) to generate a set of n-grams (105). Each n-gram (for example 107) will be submitted to a classifier algorithm (111) which will define according to a prior learning of n-grams describing malicious code (MC) and benign code (BC) from a set of learning files (113). The answer (115) of the classifier is "Malicious code" (M) or "Benign code" (B) for the n-gram or a set of n-grams. If at least one n-gram is detected as MC the file is considered as a malicious file.

Data Set Creation

A data set of malicious and benign executables for the Microsoft Windows operating system was build, as this is the system most commonly used and most commonly attacked. This collection is assumed to be large. The malicious files were downloaded from the VX Heaven website (http://ux.netlux.org). After removing obfuscated and compressed files, 7690 malicious files were considered. Table 1 shows the distribution of the benign codes and the malicious codes which are included in the global set (including files which are used is the training set and in the test set). Each main class of malcodes is represented significantly by at last few hundreds of files like it is detailed in Table 2.

To identify the files, the Kaspersky anti-virus and the Windows version of the Unix 'file' command were used for file type identification. The files in the benign set, including executable and DLL (Dynamic Linked Library) files, were gathered from machines running Microsoft Windows XP operating system, which is considered currently like one of the most used. The benign set contained 22,735 files. The Kaspersky anti-virus program (http://www.kaspersky.com) has been used to verify that these files were completely virus-free. The addition of the malicious code set and the benign code set constituted very large files set.

TABLE 1

Distribution of the main classes of malicious code in set

| Main Class | Quantity |
| --- | --- |
| Worm | 787 |
| Trojan | 4792 |
| Virus | 1229 |
| Malware | 882 |

TABLE 2

Distribution of the classes of malicious code in set

| Class | Quantity |
| --- | --- |
| Badjoke | 51 |
| Constructor | 152 |
| DenialOfService | 75 |
| Email-Flooder | 104 |

TABLE 2-continued

Distribution of the classes of malicious code in set

| Class | Quantity |
|---|---|
| Email-Worm | 563 |
| Exploit | 52 |
| Flooder | 97 |
| Trojan | 768 |
| Virus | 1229 |
| Hacktool | 57 |
| Hoax | 2 |
| IM-Flooder | 43 |
| IM-Worm | 6 |
| IRC-Worm | 67 |
| Net-Worm | 28 |
| Nuker | 99 |
| P2P-Worm | 122 |
| SMS-Flooder | 33 |
| Sniffer | 5 |
| Spoofer | 5 |
| Trojan-AOL | 74 |
| Trojan-Backdoor | 2524 |
| Trojan-Clicker | 31 |
| Trojan-Distributeddos | 23 |
| Trojan-Downloader | 171 |
| Trojan-Dropper | 207 |
| Trojan-IM | 24 |
| Trojan-Notifier | 30 |
| Trojan-PROXY | 14 |
| Trojan-PSW | 716 |
| Trojan-Spy | 210 |
| Virtool | 107 |
| Worm | 1 |

Data Preparation and Feature Selection

The files (both benign and malicious) were parsed using several n-gram lengths moving windows, denoted by n Vocabularies of 16,777,216, 1,084,793,035, 1,575,804,954 and 1,936,342,220, for 3-gram, 4-gram, 5-gram and 6-gram, respectively, were extracted. Later TF and TFIDF representation were calculated for each n-gram in each file. In ML applications, the large number of features (many of which do not contribute to the accuracy and may even decrease it) in many domains presents a complex problem. Moreover, in the current innovation problem, the reduction of the amount of features is crucial, but must be performed while simultaneously maintaining a high level of accuracy. This is due to the fact that, as shown earlier, the vocabulary size may exceed billions of features, far more than can be processed by any feature selection tool within a reasonable period of time. Additionally, it is important to identify those terms that appear in most of the files, in order to avoid zeroed representation vectors. Thus, the top features based on the DF measure (Equation 2) were extracted and the features which appear in most of the files (those with high DF scores) were selected according the approach introduced in the next lines. Based on the DF measure, two sets were selected, the top 5,500 terms and the top 1,000 to 6,500 terms. Later, three feature selection methods were applied to each of these two sets. A filters approach was used, according to which, the measure was independent of any classification algorithm to compare the performances of the different classification algorithms. In a filters approach, a measure is used to quantify the correlation of each feature to the class (malicious or benign) and estimate its expected contribution to the classification task. As a baseline, the document frequency measure DF (Equation 2), Gain Ratio (GR) [Mitchell, 1997] and Fisher Score (FS) [Golub et al., 1999] were used and allow selecting the top 50, 100, 200 and 300 results from each feature selection.

For evaluation purposes some values were computed like the True Positive Rate (TPR) measure, which is the number of positive instances classified correctly, as shown in Equation 3, False Positive Rate (FPR), which is the number of negative instances misclassified (Equation 4), and the Total Accuracy, which measures the number of absolutely correctly classified instances, either positive or negative, divided by the entire number of instances shown in Equation 5.

$$TPR = \frac{|TP|}{|TP| + |FN|} \quad [\text{Eq. 3}]$$

$$FPR = \frac{|FP|}{|FP| + |TN|} \quad [\text{Eq. 4}]$$

$$TotalAccuracy = \frac{|TP| + |TN|}{|TP| + |FP| + |TN| + |FN|} \quad [\text{Eq. 1}]$$

Two validation experiments were conducted in the first step, wide and comprehensive set of evaluation runs was designed including all the combinations of the optional settings for each of the aspects, amounting in 1536 runs in a 5-fold cross validation format for all 8 classifiers. The files in the test-set were not in the training-set presenting unknown files to the classifier.

Figure 2:
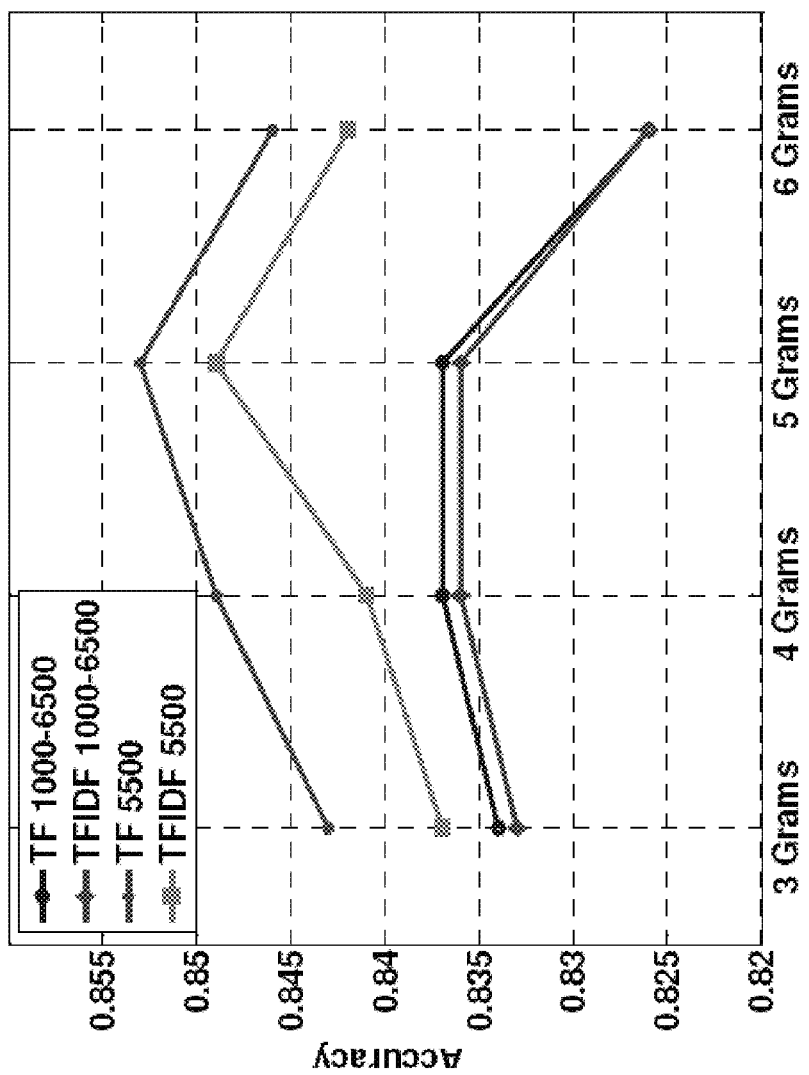
FIG. 2 graphically illustrates the mean accuracy of the combinations of the tern representations and n-grams.

In the second step, the global feature selection and the n-grams approach were compared. FIG. 2 presents the mean accuracy of the combinations of the term representations and n-grams. While the mean accuracies are quite similar, the top 5,500 features performed better, as did the TF representation and the 5-gram. Having the TF out-performing has meaningful computational advantages. Additionally, the 5-grams out-performed the others. While their mean accuracies were quite similar, the top 5,500 features out-performed the top 1000-6500, in which the TF outperformed TFIDF and the 5-gram treatment level out-performed the other n-gram treatment levels.

Figure 3:
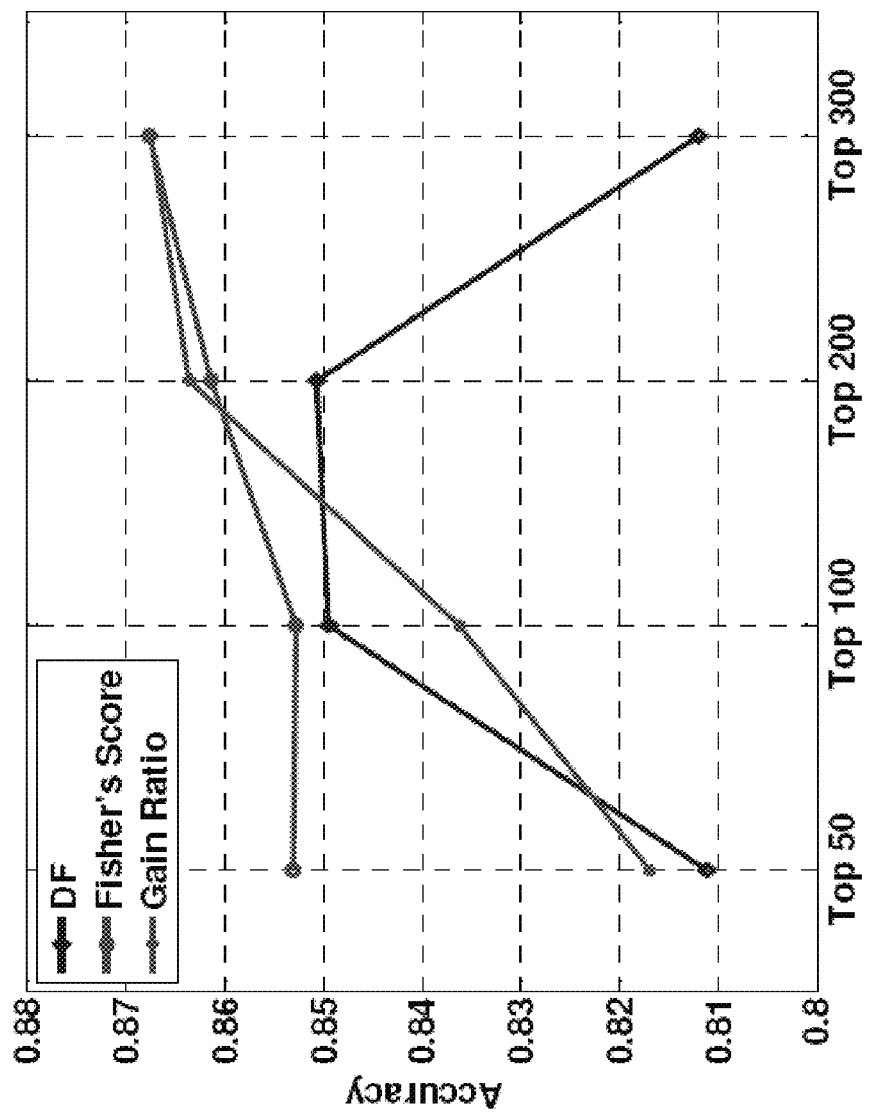
FIG. 3 graphically illustrates the mean accuracy of the three feature selections and the four top selections.

In the third step, the top feature selection was treated. FIG. 3 presents the mean accuracy of the three feature selections and the four top selections. Generally, the Fisher score was the best method, starting with high accuracy, even with 50 features. Unlike the others, in which the 300 features outperformed, the DF's accuracy decreased after the selection of more than 200 features, while the GR accuracy significantly increased as more features were added.

The Fisher score was very accurate when used with just 50 features, and maintained this high performance level as the number of features increased. When more than 200 features were added, the accuracy of GR increased significantly and the accuracy of DF decreased.

The last step of the first experiment was related to evaluation of features classification by few classifiers. Table 3 presents the results of each classifier under the best conditions observed for all the classifiers (averaged), including the top 300 Fisher score-selected 5-gram terms represented by TF from the top 5500 features. The BDT, DT and ANN outperform and have low false positive rates, while the SVM classifiers also perform very well. The poor performance of the Naïve Bayes, may be explained by the independence assumption of the NB classifier.

TABLE 3

The BDT, DT, ANN out performed, wile maintaining low levels of false positives

| Classifier | Accuracy | FP | FN |
|---|---|---|---|
| ANN | 0.941 | 0.033 | 0.134 |
| DT | 0.943 | 0.039 | 0.099 |

TABLE 3-continued

The BDT, DT, ANN out performed, wile maintaining low levels of false positives

| Classifier | Accuracy | FP | FN |
|---|---|---|---|
| NB | 0.697 | 0.82 | 0.069 |
| BDT | 0.949 | 0.040 | 0.110 |
| BNB | 0.697 | 0.382 | 0.069 |
| SVM-LIN | 0.921 | 0.033 | 0.214 |
| SVM-POLY | 0.852 | 0.014 | 0.544 |
| SVM-RBF | 0.939 | 0.029 | 0154 |

The second set of experiments has been related to the imbalance problem to learn classes for malcodes detection. In these experiments, the best configuration and the top 300 Fisher Score-selected 5-gram terms represented by TF from the top 5500 features were used. Five levels of Malicious Files Percentage (MFP) in the training set (16.7%, 33.4, 50, 66.7 and 83.4%) were defined. For example, 16.7% means that 16.7% of the files in the training set were malicious and 83.4% were benign. The improved test set represents the real-life situation, while the training set represents the set-up of the classifier, which is controlled. A MFP above 30% (of the total files) is not a realistic proportion in real networks, but high rates in order to gain insights into the behavior of the classifiers in these situations were exanimate. 17 levels of MFP (5%, 7.5, 10, 12.5, 15, 20, 30, 40, 50, 60, 70, 80, 85, 87.5, 90, 92.5 and 95%) were computed and analyzed. All the product combinations of five training sets and 17 test sets were computed for a total of 85 runs for each classifier. Two sets of data sets were built in order to perform a 2-fold cross validation-like evaluation to make the results more significant.

Figure 4:
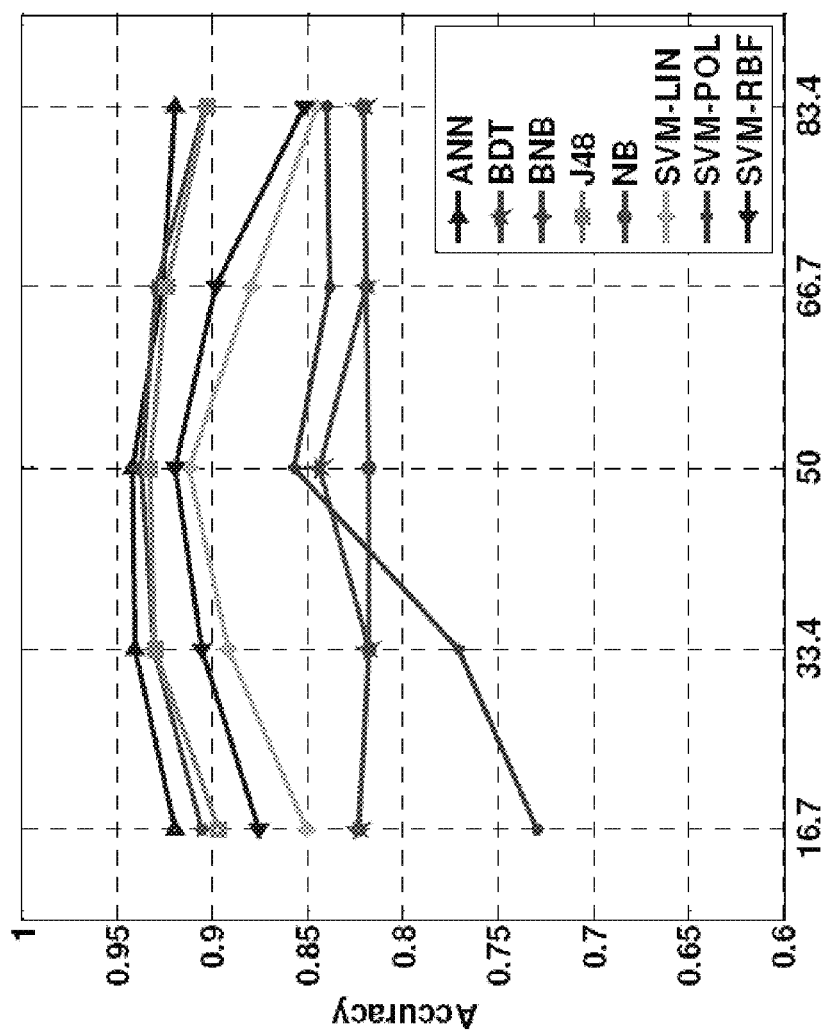
FIG. 4 graphically illustrates the mean accuracy of each classifier for each training Malicious Files Percentage (MFP) level.

FIG. 4 presents the mean accuracy (for each MFP level in the test-sets) of each classifier for each training MFP level. ANN, BNB and DT had the most accurate, and relatively stable, performance across the different MFP levels, while BNB generally performed poorly (Table 3). SVM-RBF and SVM-LIN performed well, but not consistently. They were both most accurate at the 50% level, while the accuracy of SVM increased as more malicious examples were presented.

Figure 5:
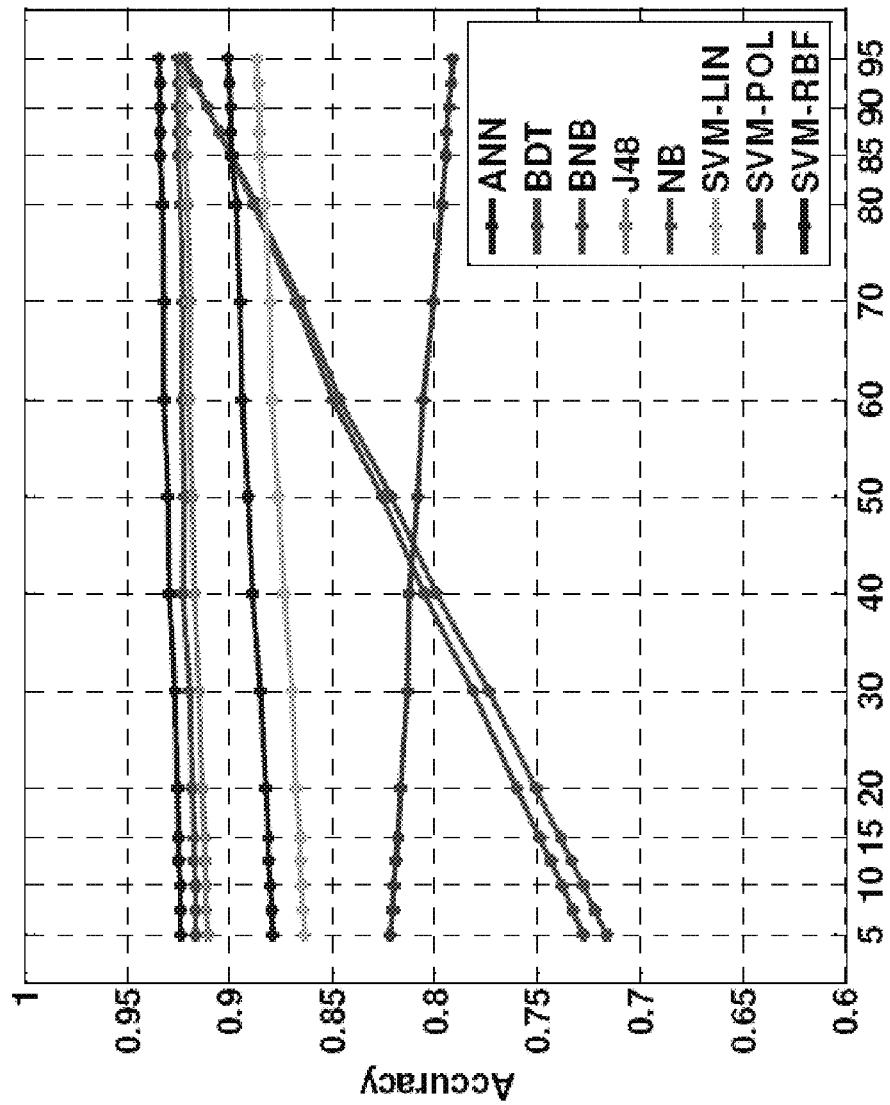
FIG. 5 graphically illustrates the mean accuracy of each classifier for each malcode content level in the test set.

FIG. 5 presents the mean accuracy (across all the malcode percentage levels in the training sets) of each classifier for each malcode content level in the test sets. These results show how the classifiers' mean behavior reacts to the MFP levels of the test-sets, representing more realistic situations. The outperforming classifiers are more stable than those shown in FIG. 4. This means that the methods proposed by the present invention classify correctly in any situation independent of the MFP ratio in the training set. However, NB and BDT were not very accurate when presented with low levels of malicious file content and the accuracy of SVM-POL decreased as the malicious file content of the test set increased. ANN, BNB and DT achieved about 93% stable accuracy across all the levels of malcode content in the test set, as shown in FIG. 5.

Figure 6:
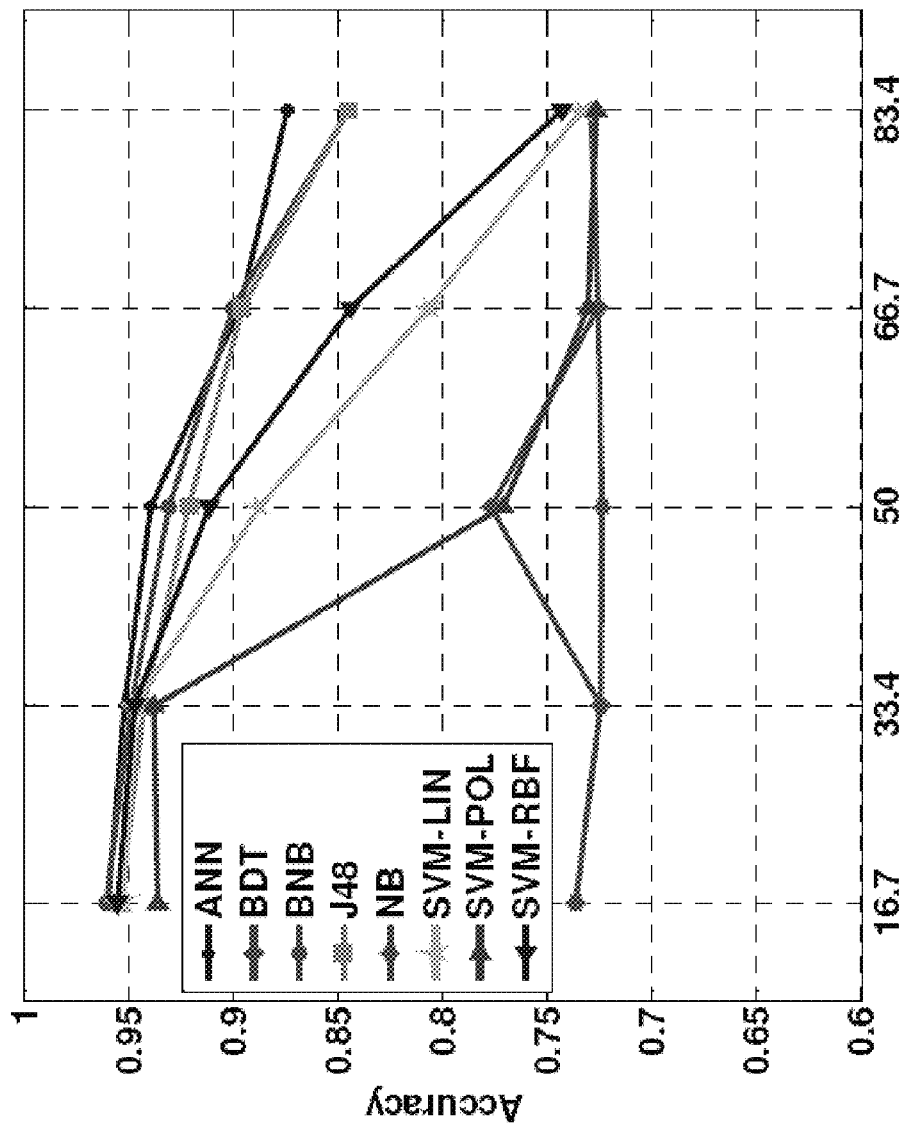
FIG. 6 graphically illustrates the mean accuracy in the 2-flord cross validation of each malcode content level in the training set, with a fixed level of 10% MFP in the test set.

In the next step, the 10% MFP level in the test set as a realistic scenario were considered. FIG. 6 presents the mean accuracy in the 2-fold cross validation of each classifier for each malcode content level in the training set, with a fixed level of 10% MFP in the test set. Accuracy levels above 95% were achieved when the training set had a MFP of 16.7%, while a rapid decrease in accuracy was observed when the MFP in the training set was increased. Thus, the optimal proportion in a training set for practical purposes should be in the range of 10% to 40% malicious files.

Figure 7:
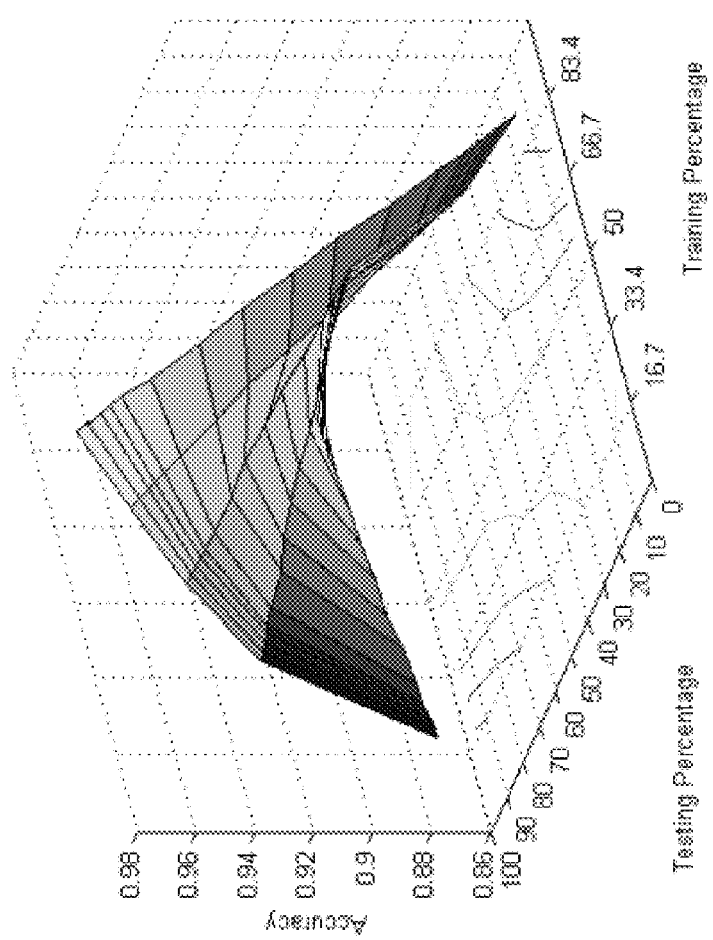
FIG. 7 graphically illustrates the accuracy for the MFP level in the two sets in a 3-demensional presentation for the Artificial Neural Networks classifier.
Figure 8:
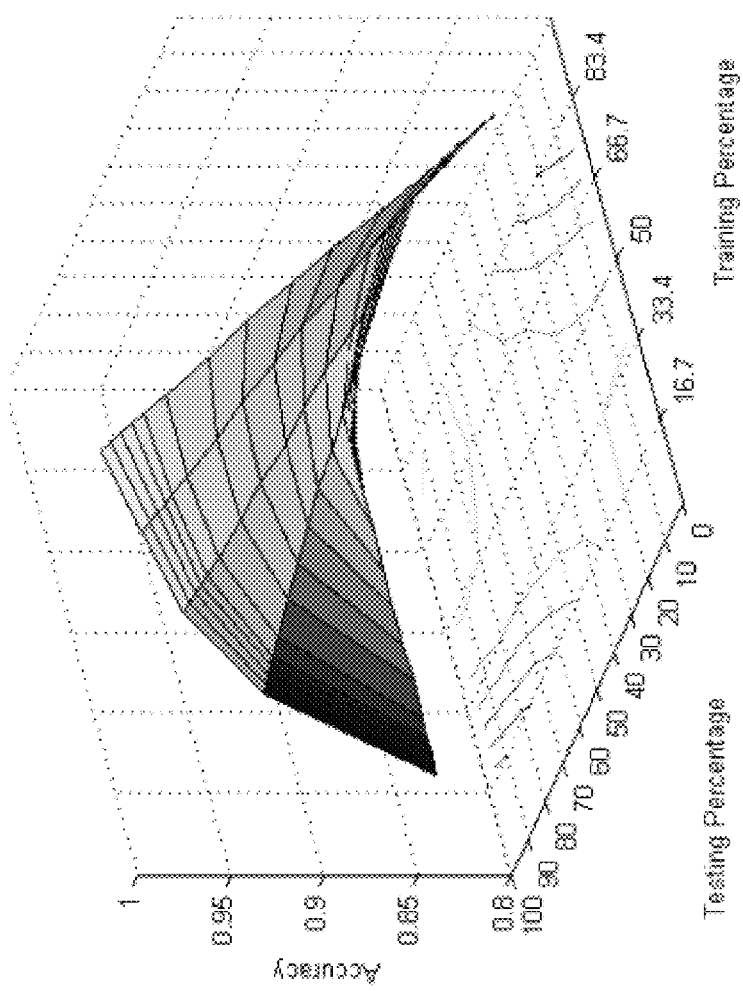
FIG. 8 graphically illustrates the accuracy for the MFP level in the two sets in a 3-demensional presentation for the Decision Tree classifier.
Figure 9:
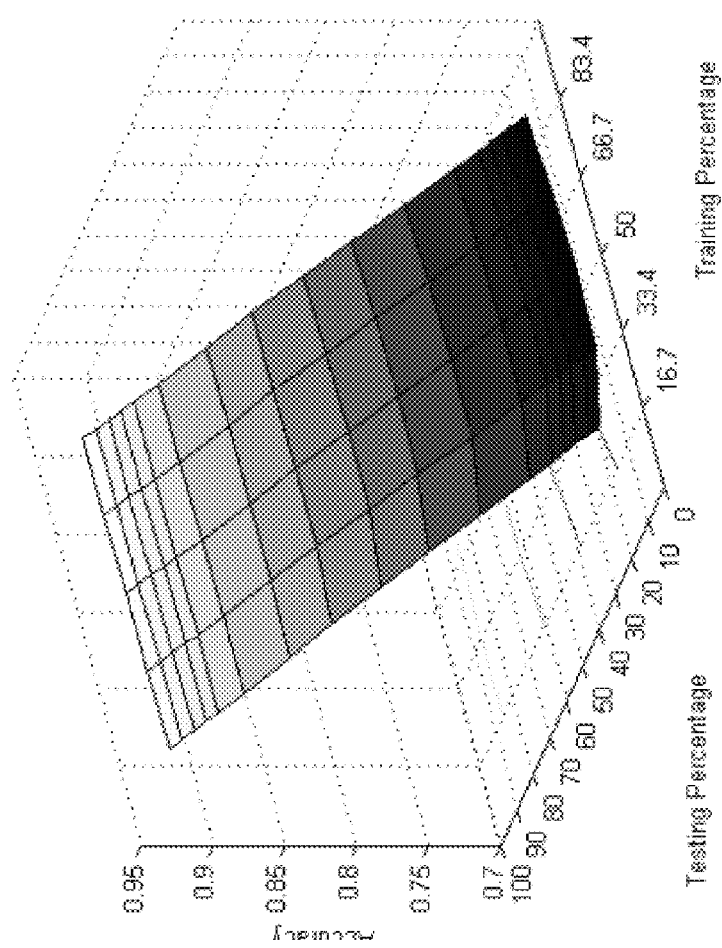
FIG. 9 graphically illustrates the accuracy for the MFP level in the two sets in a 3-demensional presentation for the Naïve Bayes classifier.
Figure 10:
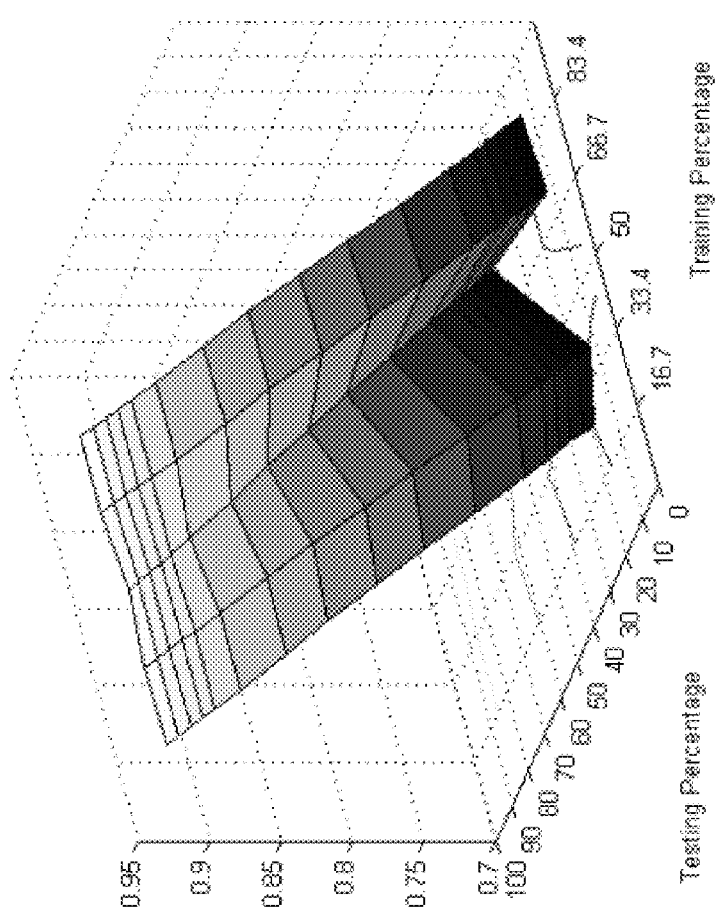
FIG. 10 graphically illustrates the accuracy for the MFP level in the two sets in a 3-demensional presentation for the Boosted Decision Tree (BDT) classifier.
Figure 11:
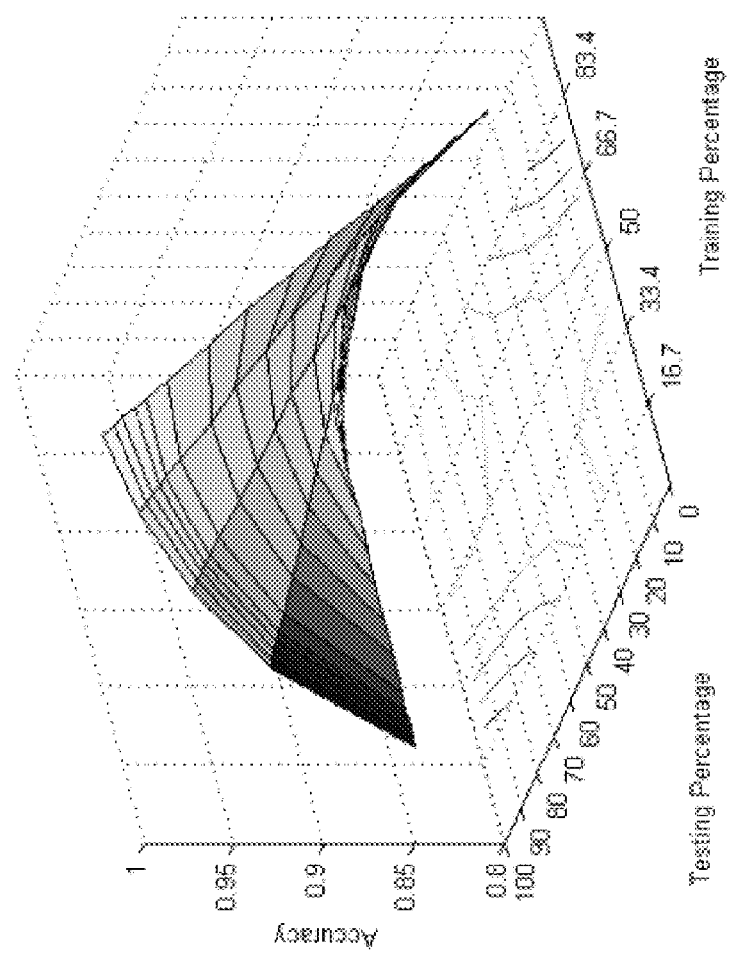
FIG. 11 graphically illustrates the accuracy for the MFP level in the two sets in a 3-demensional presentation for the Boosted Naives Bayes (BNB) classifier.
Figure 12:
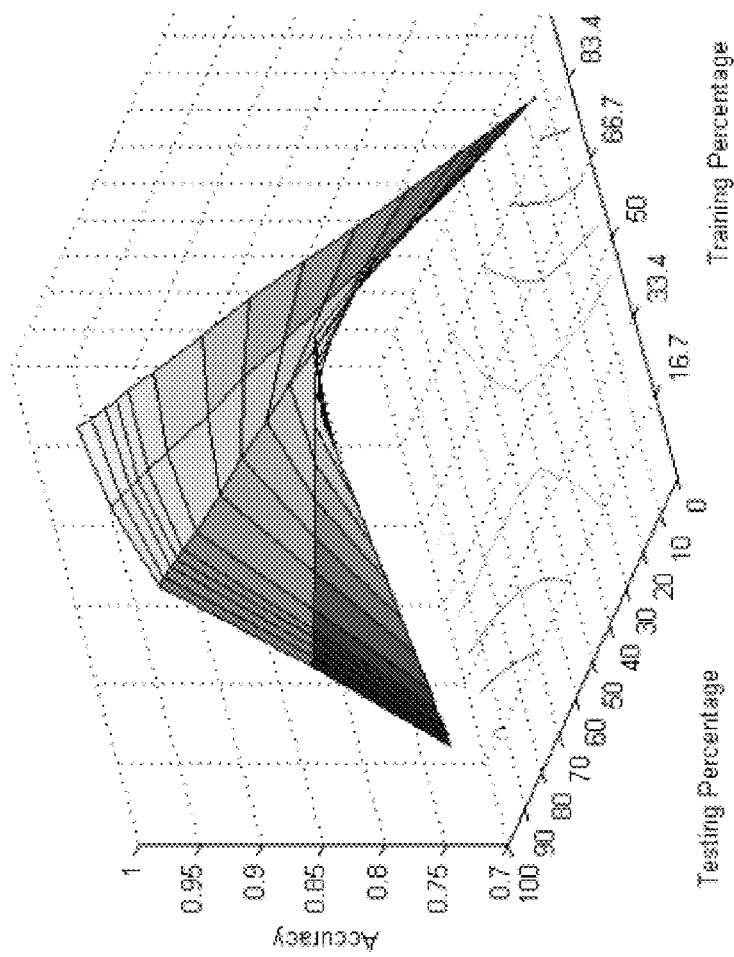
FIG. 12 graphically illustrates the accuracy for the MFP level in the two sets in a 3-demensional presentation for the Linear SVM (SVM-LIN) classifier.
Figure 13:
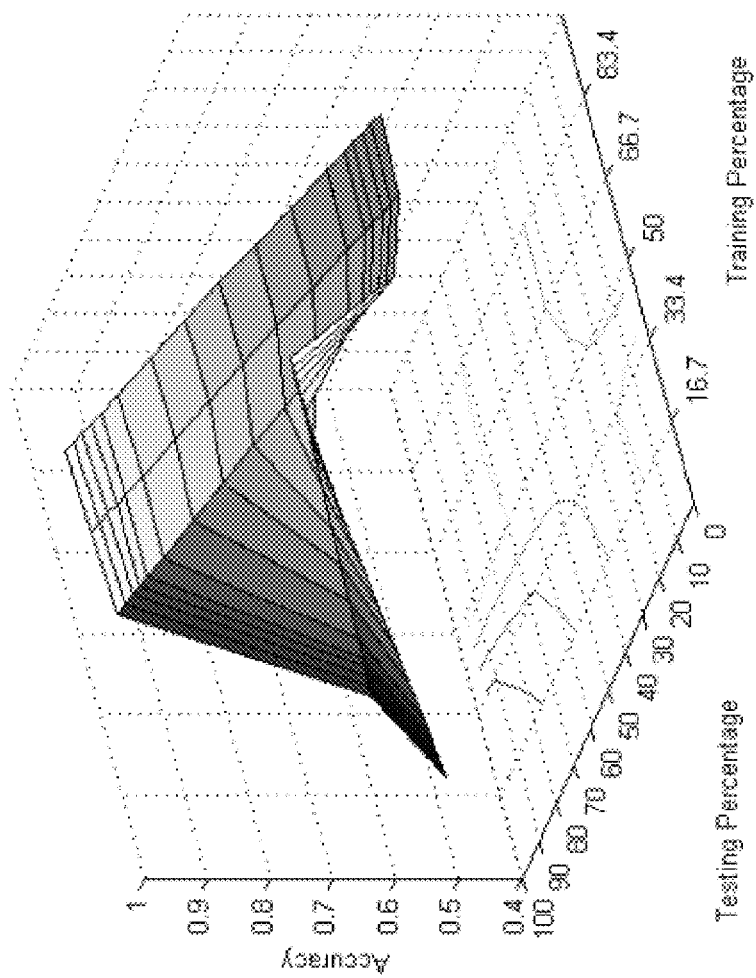
FIG. 13 graphically illustrates the accuracy for the MFP level in the two sets in a 3-demensional presentation for the Polynomial SVM (SVM-POL) classifier.
Figure 14:
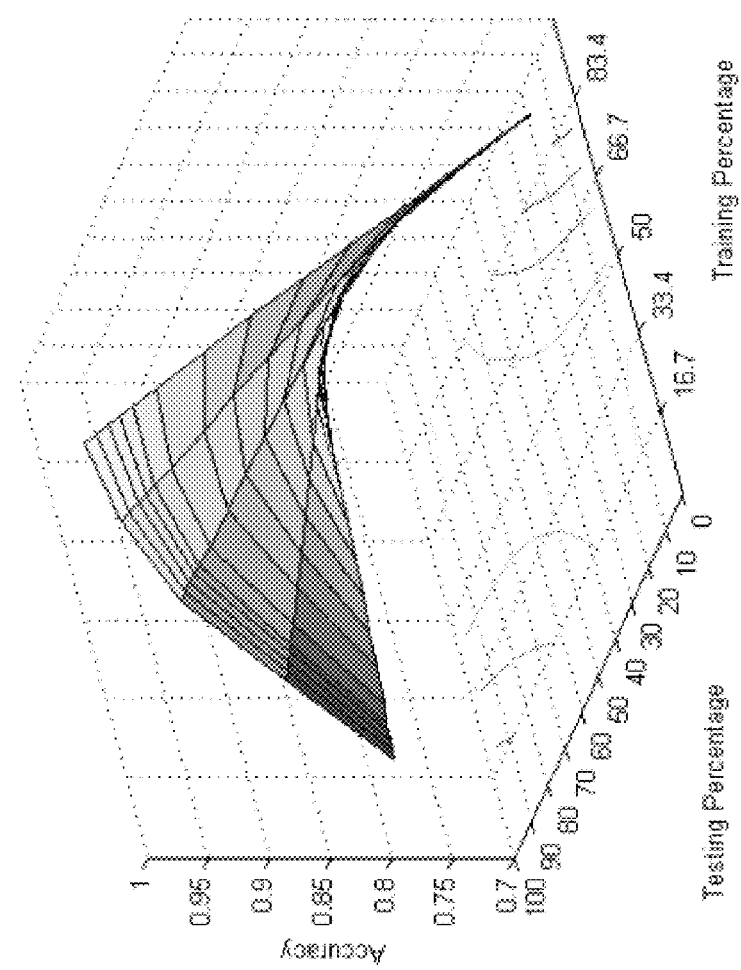
FIG. 14 graphically illustrates the accuracy for the MFP level in the two sets in a 3-demensional presentation for the RBF SVM (SVM-RBF) classifier.

To further the previous elements, related to the mean accuracy from the training set point of view (FIGS. 4 and 6) and that of the test set (FIG. 5), a detailed description of the accuracy for the MFP levels in the 2 sets in a 3-dimensional representation for each type of classifier is presented by FIGS. 7 to 14. FIG. 7 illustrates the accuracy for the MFP level in the two sets for the Artificial Neural Networks (ANN) classifier. FIG. 8 illustrates the accuracy for the MFP level in the two sets for the Decision Tree classifier. FIG. 9 illustrates the accuracy for the MFP level in the two sets in for the Naïve Bayes classifier. FIG. 10 illustrates the accuracy for the MFP level in the two sets for the Boosted Decision Tree (BDT) classifier. FIG. 11 illustrates the accuracy for the MFP level in the two sets for the Boosted Naives Bayes (BNB) classifier. FIG. 12 illustrates the accuracy for the MFP level in the two sets for the Linear SVM (SVM-LIN) classifier. FIG. 13 illustrates the accuracy for the MFP level in the two sets for the Polynomial SVM (SVM-POL) classifier. FIG. 14 illustrates the accuracy for the MFP level in the two sets for the RBF SVM (SVM-RBF) classifier.

Most of the classifiers behaved optimally when the MFP levels in the training-set and test-set were similar, except for NB and BDT, which showed low performance levels earlier. This indicates that when configuring a classifier for a real-life application, the MFP in the training-set has to be set accordingly.

The present invention allows the detection and the acquisition of unknown malicious code. It is based on concepts from IR and more specifically Text Categorization. In the malcode detection problem, binary files (which could be executables) are parsed and n-gram terms are extracted. Each n-gram term in the malcode detection problem is analogous to words in the textual domain.

According to the present innovation, the implementation of the current method can be used anywhere on a network to allow detection of unknown malicious code and to reduce the risk of dissemination of malicious files.

The method proposed by the present invention is able to detect a high number of malicious code files after a learning process based on a real life ratio between malcode and benign files.

Although embodiments of the invention have been described by way of illustration, it will be understood that the invention may be carried out with many variations, modifications, and adaptations, without exceeding the scope of the claims.

The invention claimed is:

1. A method for detecting unknown malicious code in a computer readable file, comprising:
  a) creating a Data Set being a collection of files that includes a first subset with malicious code files and a second subset with benign code files;
  b) identifying malicious code files and benign code files by an antivirus program;
  c) parsing all files using n-gram moving windows of several lengths;
  d) for each n-gram in each file, computing a term frequency (TF) representation, wherein the TF representation of an n-gram is the frequency of this n-gram in one of the files;
  e) selecting an initial set of top features of all n-grams, based on a document frequency (DF) measure, wherein the DF measure indicates those of the files containing a given n-gram;
  f) reducing the number of the top features to comply with the computation resources required for classifier training, by using features selection methods, wherein the features selection methods are DF measure, Gain Ratio and Fisher Score;

g) determining an optimal number of features based on the evaluation of the detection accuracy of several sets of reduced top features;

h) preparing different data sets with different distributions of benign code files and malicious code files, based on said optimal number, which will be used as training and test sets, wherein a percentage of malicious code files in each data set is in a range between 10% and 40% of all the files in the said data set;

i) for each classifier:
  i.1) iteratively evaluating the detection accuracy for all combinations of training and test sets distributions, while in each iteration training a classifier using a specific distribution and testing the trained classifier on all distributions; and
  i.2) selecting the optimal distribution that results with the highest detection accuracy.

2. A method according to claim 1, wherein the malicious code is a malicious executable.

* * * * *